United States Patent
Buckley et al.

(10) Patent No.: US 7,256,225 B2
(45) Date of Patent: *Aug. 14, 2007

(54) METHODS OF PREPARING A POLYMERIC MATERIAL

(75) Inventors: Paul W. Buckley, Scotia, NY (US); Jiawen Dong, Rexford, NY (US); Mark H. Giammattei, Selkirk, NY (US); Hua Guo, Selkirk, NY (US); Norberto Silvi, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 357 days.

This patent is subject to a terminal disclaimer.

(21) Appl. No.: 10/648,647

(22) Filed: Aug. 26, 2003

(65) Prior Publication Data

US 2005/0049333 A1   Mar. 3, 2005

(51) Int. Cl.
*C08J 3/00* (2006.01)

(52) U.S. Cl. .................. 523/340; 523/342; 528/502 A; 528/502 E

(58) Field of Classification Search ................ 523/340, 523/342; 528/502 A, 502 E
See application file for complete search history.

(56) References Cited

U.S. PATENT DOCUMENTS

| | | |
|---|---|---|
| 3,306,874 A | 2/1967 | Hay |
| 3,306,875 A | 2/1967 | Hay |
| 3,365,422 A | 1/1968 | Van Dort |
| 3,383,435 A | 5/1968 | Cizek |
| 3,451,462 A | 6/1969 | Szabo et al. |
| 3,457,343 A | 7/1969 | Lohuizen et al. |
| 3,639,656 A | 2/1972 | Bennett et al. |
| 3,642,699 A | 2/1972 | Cooper et al. |
| 3,661,848 A | 5/1972 | Cooper et al. |
| 3,733,299 A | 5/1973 | Copper et al. |
| 3,838,102 A | 9/1974 | Bennett et al. |
| 3,962,181 A | 6/1976 | Sakauchi et al. |
| 3,973,890 A | 8/1976 | Porter et al. |
| 4,054,553 A | 10/1977 | Olander |
| 4,083,828 A | 4/1978 | Olander |
| 4,092,294 A | 5/1978 | Bennett, Jr. et al. |
| 4,373,065 A | 2/1983 | Prest, Jr. |
| 4,421,470 A | 12/1983 | Nakamura |
| 4,500,706 A | 2/1985 | Mathis et al. |
| 4,760,118 A | 7/1988 | White et al. |
| 4,808,262 A | 2/1989 | Aneja et al. |
| 4,845,142 A | 7/1989 | Niwano et al. |
| 4,889,756 A | 12/1989 | Barzynski et al. |
| 4,987,194 A | 1/1991 | Maeda et al. |
| 4,992,222 A | 2/1991 | Banevicius et al. |
| 4,994,217 A | 2/1991 | Banevicius et al. |
| 5,017,655 A | 5/1991 | Kase et al. |
| 5,053,288 A | 10/1991 | Hashimoto et al. |
| 5,102,591 A | 4/1992 | Hasson et al. |
| 5,130,356 A | 7/1992 | Feuerherd et al. |
| 5,204,410 A | 4/1993 | Banevicius et al. |
| 5,250,486 A | 10/1993 | Shaffer |
| 5,586,110 A | 12/1996 | Nakaki |
| 5,607,700 A | 3/1997 | Kando et al. |
| 5,833,848 A | 11/1998 | Tominari et al. |
| 6,100,366 A | 8/2000 | Nakata et al. |
| 6,306,978 B1 | 10/2001 | Braat et al. |
| 6,365,710 B1 | 4/2002 | Wang et al. |
| 6,372,175 B1 | 4/2002 | Inoue et al. |
| 6,407,200 B1 | 6/2002 | Singh et al. |
| 6,437,084 B1 | 8/2002 | Birsak et al. |
| 6,444,779 B1 | 9/2002 | Singh et al. |
| 6,469,128 B1 | 10/2002 | Guo et al. |
| 6,475,589 B1 | 11/2002 | Pai-Paranjape et al. |
| 6,667,952 B2 | 12/2003 | Komaki et al. |
| 6,775,838 B2 | 8/2004 | Komaki et al. |
| 6,924,350 B2 | 8/2005 | Dong et al. |
| 6,949,622 B2 | 9/2005 | Silvi et al. |
| 7,041,780 B2 * | 5/2006 | Buckley et al. ............. 528/501 |
| 2001/0000520 A1 | 4/2001 | Braat et al. |
| 2002/0048691 A1 | 4/2002 | Davis et al. |
| 2002/0055608 A1 | 5/2002 | Braat et al. |
| 2002/0062054 A1 | 5/2002 | Cistone et al. |
| 2002/0094455 A1 | 7/2002 | Feist et al. |
| 2002/0151606 A1 | 10/2002 | Bates et al. |
| 2002/0197438 A1 | 12/2002 | Hay et al. |

(Continued)

FOREIGN PATENT DOCUMENTS

CA          1063761          9/1979

(Continued)

OTHER PUBLICATIONS

International Search Report; International Application No. PCT/US2004/027605; Applicant's Reference No. 135946; International Filing Date Aug. 26, 2004; Date of Mailing Dec. 17, 2004; 7 pages.

(Continued)

*Primary Examiner*—Edward J. Cain
(74) *Attorney, Agent, or Firm*—Cantor Colburn LLP

(57) ABSTRACT

A method is disclosed to prepare a polymeric material by filtering solutions of poly(arylene ether) and/or poly(alkenyl aromatic) through one or more filtration systems to provide a material having reduced levels of particulate impurities. The polymeric material prepared is suitable for use in data storage media applications.

50 Claims, No Drawings

U.S. PATENT DOCUMENTS

| | | |
|---|---|---|
| 2002/0197441 A1 | 12/2002 | Hariharan et al. |
| 2003/0044564 A1 | 3/2003 | Dris et al. |
| 2003/0067089 A1 | 4/2003 | Wang et al. |
| 2005/0046070 A1 | 3/2005 | Dong et al. |
| 2005/0048252 A1 | 3/2005 | Dris et al. |
| 2005/0049362 A1 | 3/2005 | Buckley et al. |
| 2005/0049393 A1 | 3/2005 | Silvi et al. |
| 2005/0049394 A1 | 3/2005 | Dong et al. |
| 2005/0064129 A1 | 3/2005 | Dong et al. |
| 2005/0117405 A1 | 6/2005 | Dris et al. |
| 2005/0129953 A1 | 6/2005 | Breitung et al. |
| 2005/0180284 A1 | 8/2005 | Hay et al. |
| 2005/0202201 A1 | 9/2005 | Hay et al. |
| 2005/0233151 A1 | 10/2005 | Feist et al. |
| 2005/0234218 A1 | 10/2005 | Silvi et al. |
| 2005/0234219 A1 | 10/2005 | Silvi et al. |
| 2005/0250932 A1 | 11/2005 | Hossan et al. |
| 2006/0089487 A1 | 4/2006 | Silvi et al. |

FOREIGN PATENT DOCUMENTS

| | | |
|---|---|---|
| EP | 0 102 122 | 8/1983 |
| EP | 0 225 801 | 12/1986 |
| EP | 0 271 000 | 12/1987 |
| EP | 0 295 891 | 6/1988 |
| EP | 0 303 209 | 8/1988 |
| EP | 0 642 124 | 9/1994 |
| EP | 0 724 259 | 1/1996 |
| EP | 0 770 637 | 10/1996 |
| EP | 1 047 055 | 4/1999 |
| EP | 1 031 972 | 2/2000 |
| EP | 1 130 587 | 3/2001 |
| EP | 1 167 419 | 6/2001 |
| EP | 1 167 420 | 6/2001 |
| EP | 1 167 421 | 6/2001 |
| EP | 1321930 A1 | 6/2003 |
| JP | 63-301247 | 5/1987 |
| JP | 1-92209 | 10/1987 |
| JP | 63-309547 | 10/1987 |
| JP | 63-13722 | 1/1988 |
| JP | 63-86738 | 4/1988 |
| JP | 63-91231 | 4/1988 |
| JP | 63-91232 | 4/1988 |
| JP | 63256427 | 10/1988 |
| JP | 64-42601 | 2/1989 |
| JP | 2-107651 | 4/1990 |
| JP | 2-208342 | 8/1990 |
| JP | 9-237437 | 9/1997 |
| WO | 9205940 A1 | 4/1992 |
| WO | WO 01/11618 | 2/2001 |
| WO | WO 02/43943 | 6/2002 |

OTHER PUBLICATIONS

JP11268098. Publication Date Oct. 5, 1999. Abstract Only.
JP58147332. Publication Date Sep. 2, 1983. Abstract Only.
JP 6093014. Publication Date Apr. 5, 1994. Abstract Only.
Paul F. Ranken, "Flame Retardants". Plastics Additives Handbook, 5th Editions. Hanser Publishers, Munich pp. 681-698. (2001).
R. Scherrer. "Colorants" Plastics Additives Handbook. 5th Edition. Hanser Publishers, Munich pp. 813-882 (2001).
http://www.atofina.com/groupe/gb/actucomm/print.cfm?IDComm=5052. Oct. 2001.
International Search Report ; International Application No. PCT/US2004/027694; International Filing Date Aug. 25, 2004; Applicant's File Reference No. 131982; Date of Mailing Dec. 27, 2004; 6 pages.
JP61130307; Jun. 18, 1986; Abstract Only (1 page).
JP63-56832; Nov. 3, 1988; Translation (10 pages).

* cited by examiner

METHODS OF PREPARING A POLYMERIC MATERIAL

BACKGROUND OF INVENTION

The present methods are directed to preparing a polymeric material comprising poly(arylene ether) and poly(alkenyl aromatic) by filtration of solutions comprising poly(arylene ether) and/or poly(alkenyl aromatic) resins. The methods are more particularly directed to filtration of the solutions to remove particulate impurities to produce poly(arylene ether)-poly(alkenyl aromatic) polymeric material having reduced amounts of particulates.

Optical, magnetic and magneto-optic media are primary sources of high performance storage technology that enable high storage capacity coupled with a reasonable price per megabyte of storage. Areal density, typically expressed as billions of bits per square inch of disk surface area (gigabits per square inch ($Gbits/in^2$)), is equivalent to the linear density (bits of information per inch of track) multiplied by the track density in tracks per inch. Improved areal density has been one of the key factors in the price reduction per megabyte, and further increases in areal density continue to be demanded by the industry.

In the area of optical storage, advances focus on access time, system volume, and competitive costing. Increasing areal density is being addressed by focusing on the diffraction limits of optics (using near-field optics), investigating three dimensional storage, investigating potential holographic recording methods and other techniques.

Polymeric data storage media has been employed in areas such as compact disks (CD) and recordable or re-writable compact discs (e.g., CD-RW), and similar relatively low areal density devices, e.g. less than about 1 $Gbits/in^2$, which are typically read-through devices requiring the employment of a good optical quality substrate having low birefringence.

Unlike the CD, storage media having high areal density capabilities, typically up to or greater than about 5 $Gbits/in^2$, employ first surface or near field read/write techniques in order to increase the areal density. For such storage media, although the optical quality of the substrate is not relevant, the physical and mechanical properties of the substrate become increasingly important. For high areal density applications, including first surface applications, the surface quality of the storage media can affect the accuracy of the reading device, the ability to store data, and replication qualities of the substrate.

While there are materials presently available for use in data storage media, there remains a need for additional polymeric materials possessing the combined attributes necessary to satisfy the increasingly exacting requirements for data storage media applications.

SUMMARY OF INVENTION

In one embodiment a method of preparing a polymeric material comprises filtering a first solution comprising poly(arylene ether), poly(alkenyl aromatic), and a solvent through a first filtration system to form a first filtrate; concentrating the first filtrate to form a second solution having a percent weight solids level greater than the first filtrate; filtering the second solution through a second filtration system to create a second filtrate; and isolating a polymeric material comprising poly(arylene ether) and poly(alkenyl aromatic) from the second filtrate.

In another embodiment, a method of preparing a polymeric material comprises filtering a first solution comprising poly(arylene ether) and a solvent through a first filtration system to form a first filtrate; combining the first filtrate and a poly(alkenyl aromatic) to form a second solution; filtering the second solution through a second filtration system to create a second filtrate; and isolating a polymeric material comprising poly(arylene ether) and poly(alkenyl aromatic) from the second filtrate.

In yet another embodiment, a method of preparing a polymeric material comprises filtering a superheated solution comprising poly(arylene ether), poly(alkenyl aromatic), and a solvent in a solution filtration system to form a filtrate; and isolating a polymeric material from the filtrate, wherein the polymeric material comprises poly(arylene ether) and poly(alkenyl aromatic).

Other embodiments, including articles made from the polymeric material, are described below.

DETAILED DESCRIPTION

Due to the surface quality requirements of high areal density storage media, it is desirable that current data storage media are prepared from materials containing limited quantities of particulate impurities. Visible particulate impurities, such as gels and carbonized polymeric material, are undesirable as an aesthetic defect resulting in a consumer's perception of an inferior quality product. Particles having sizes larger than about 50 micrometers can act as stress concentrators in molded articles, thereby reducing the impact strength of these articles. Particulate impurities about 1 micrometer in size contribute to an increase in haze which can affect the transmittance of light through or transparency of articles molded from material containing such impurities. Most importantly, particulate impurities may affect surface quality of storage media thereby affecting read accuracy, data storage, and replication.

Visible particulates or "black specks" and microscopic particulates are often present in poly(arylene ether) compositions as the poly(arylene ether) is subject to oxidative degradation at high temperatures. Poly(arylene ether)s tend to form carbonized "black specks" when processed at high extruder shear rates and/or at high temperatures.

The above-described needs are alleviated by a method of preparing a polymeric material comprising filtering solutions of poly(arylene ether) and/or poly(alkenyl aromatic). The filtration step removes particulate impurities present in the polymeric material to result in a polymeric material comprising reduced quantities of particulate impurities.

As used herein, the term "substantially free of visible particulate impurities" means that a ten gram sample of a polymeric material dissolved in fifty milliliters of chloroform ($CHCl_3$) exhibits fewer than 5 visible specks when viewed in a light box. Particles visible to the naked eye are typically those greater than 40 micrometers in diameter.

As used herein, the term "substantially free of particulate impurities greater than about 15 micrometers" means that of a forty gram sample of polymeric material dissolved in 400 milliliters of $CHCl_3$, the number of particulates per gram having a size of about 15 micrometers is less than 50, as measured by a Pacific Instruments ABS2 analyzer based on the average of five samples of twenty milliliter quantities of the dissolved polymeric material that is allowed to flow through the analyzer at a flow rate of one milliliter per minute (plus or minus five percent).

As used herein, the term "polymeric material" is inclusive of poly(arylene ether), poly(alkenyl aromatic) or a combination of the foregoing.

Described herein are methods to purify polymeric material via the filtration of solutions of the polymeric material to remove particulate impurities that may be present. The removal of particulate impurities from the solution of poly (arylene ether), poly(alkenyl aromatic), or a combination of the foregoing may be accomplished by any presently known filtration system or device. Preferably, the solutions are filtered more than once through filtration systems comprising the same or varying filter material types, filter pore sizes, and filter geometries to obtain suitably clean polymeric material for a particular application. The same or different filtration system may be used for the methods comprising multiple filtration steps.

In one embodiment, a solution of poly(arylene ether) and solvent is filtered in the absence of poly(alkenyl aromatic). In another embodiment, the solution to be filtered comprises poly(arylene ether), poly(alkenyl aromatic), and solvent. The form of poly(arylene ether) or poly(alkenyl aromatic) to prepare the solution may be in any form, preferably as a powder, flake, or pellet. Additionally, the poly(arylene ether) and/or poly(alkenyl aromatic) source to be used to prepare the solutions may be a direct product feed stream from a reactor or reaction vessel.

To form the solution to be filtered, the poly(arylene ether) and/or poly(alkenyl aromatic) is combined with an appropriate solvent with optional heating. The solution prepared may be of any percent weight solids level of poly(arylene ether) and/or poly(alkenyl aromatic) to allow efficient filtration based on the particular filtration system used. Suitable solutions may have a percent weight solids of about 1 to about 99 weight percent solids based on the total of polymeric material and solvent. Within this range a weight percent solids of less than or equal to about 90 may be employed, with less than or equal to about 80 preferred, and less than or equal to about 70 weight percent more preferred. Also within this range a weight percent solids of greater than or equal to about 30 may be used, with greater than or equal to about 40 preferred, and greater than or equal to about 50 more preferred.

The solution to be filtered may be heated prior to and/or during the filtration step. Suitable temperatures of the solutions prior to and/or during the filtration step may be of about 50° C. to about 250° C. Within this range, a temperature of less than or equal to about 210° C. may be employed, with less than or equal to about 190° C. preferred, and less than or equal to about 180° C. more preferred. Also within this range, a temperature of greater than or equal to about 100° C. may be employed, with greater than or equal to about 130° C. preferred, and greater than or equal to about 160° C. more preferred.

Suitable temperatures of the solutions prior to and/or during the filtration step may be of about 100° C. to about 170° C. for the case when ortho-dichlorobenzene solvent is used, and the solution is filtered at atmospheric pressure. Within this range, a temperature of less than or equal to about 170° C. may be employed, with less than or equal to about 160° C. preferred, and less than or equal to about 150° C. more preferred. Also within this range, a temperature of greater than or equal to about 100° C. may be employed, with greater than or equal to about 120° C. preferred, and greater than or equal to about 130° C. more preferred.

In one embodiment, the solution to be filtered is superheated. The term superheated is inclusive of heating the solution to a temperature greater than the boiling point of the solvent at atmospheric pressure. In this embodiment, the temperature of the superheated solution may be about 2° C. to about 200° C. greater than the boiling point of the solvent at atmospheric pressure. In instances where there are multiple solvents present, the solution is superheated with respect to at least one of the solvent components. Superheating may be achieved by heating the solution under pressure. In another embodiment, superheating may be accomplished by applying vacuum to the solution so the surrounding pressure is lower than the vapor pressure of the solvent in the solution. In this instance the solution may said to be superheated even though the solution is at a temperature below the boiling point of the solvent at atmospheric pressure. An advantage of superheating the solution is the convenient and expeditious removal of the solvent to result in the isolated polymeric material.

The filtration of the solutions and/or isolation of the polymeric material are preferably performed under an inert atmosphere, such as nitrogen, to prevent oxidative degradation processes in the polymeric material at the elevated temperatures of these operations.

Suitable filtration systems include filters made from a variety of materials such as, but not limited to, sintered-metal, cloth, polymeric fiber, natural fiber, paper, metal mesh, pulp, ceramic, or a combination of the foregoing materials, and the like. Particularly useful filters are sintered metal filters exhibiting high tortuosity, including the filters prepared by PALL Corporation.

The geometry of the filter may be cone, pleated, candle, stack, flat, wraparound, or a combination of the foregoing, and the like.

The pore size of the filter may be of any size in the range of 0.01 micrometers to 100 micrometers, or greater. Within this range, a pore size of less than or equal to about 50 micrometers can be employed, with less than or equal to about 20 micrometers preferred, and less than or equal to about 15 micrometers more preferred. Also preferred within this range is a pore size of greater than or equal to about 0.1 micrometer, with greater than or equal to about 3 micrometers more preferred, and greater than or equal to about 5 micrometers especially preferred.

Suitable filtration processes may include gravity filtration, pressure filtration, vacuum filtration, batch filtration, continuous filtration, or a combination of the foregoing filtration methods, and the like.

Any number of filtration systems may be used for the method. A single filtration system may be used or two or more in series or in parallel.

The polymeric material obtained from the present method is preferably substantially free of visible particulate impurities and/or substantially free of particulate impurities greater than about 15 micrometers.

The term poly(arylene ether) includes polyphenylene ether (PPE) and poly(arylene ether) copolymers; graft copolymers; poly(arylene ether) ether ionomers; and block copolymers of alkenyl aromatic compounds, vinyl aromatic compounds, and poly(arylene ether), and the like; and combinations comprising at least one of the foregoing; and the like. Poly(arylene ether)s per se, are known polymers comprising a plurality of structural units of the formula (I):

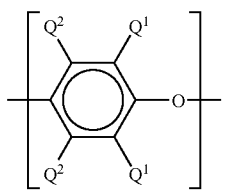

(I)

wherein for each structural unit, each $Q^1$ is independently halogen, primary or secondary lower alkyl (e.g., alkyl containing up to 7 carbon atoms), phenyl, haloalkyl, aminoalkyl, hydrocarbonoxy, or halohydrocarbonoxy wherein at least two carbon atoms separate the halogen and oxygen atoms, or the like; and each $Q^2$ is independently hydrogen, halogen, primary or secondary lower alkyl, phenyl, haloalkyl, hydrocarbonoxy, or halohydrocarbonoxy wherein at least two carbon atoms separate the halogen and oxygen atoms, or the like. It will be understood that the term "haloalkyl" includes alkyl groups substituted with one or more halogen atoms, including partially and fully halogenated alkyl groups. Preferably, each $Q^1$ is alkyl or phenyl, especially $C_{1-4}$ alkyl, and each $Q^2$ is hydrogen or $C_{1-4}$ alkyl.

Both homopolymer and copolymer poly(arylene ether) are included. The preferred homopolymers are those containing 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether) containing moieties prepared by grafting vinyl monomers or polymers such as polystyrenes, as well as coupled poly(arylene ether) in which coupling agents such as low molecular weight polycarbonates, quinones, heterocycles and formals undergo reaction in known manner with the hydroxy groups of two poly(arylene ether) chains to produce a higher molecular weight polymer. Poly(arylene ether)s further include combinations comprising at least one of the above. Preferred poly(arylene ether)s are poly(2,6-dimethylphenylene ether) and poly(2,6-dimethylphenylene ether-co-2,3,6-trimethylphenylene ether) such as those described in U.S. Pat. No. 6,407,200 to Singh et al. and U.S. Pat. No. 6,437,084 to Birsak et al.

The poly(arylene ether) generally has a number average molecular weight of about 3,000-40,000 atomic mass units (amu) and a weight average molecular weight of about 20,000-80,000 amu, as determined by gel permeation chromatography. The poly(arylene ether) may have an intrinsic viscosity (IV) of about 0.10 to about 0.60 deciliters per gram (dl/g), as measured in chloroform at 25° C. Within this range an IV of less than or equal to about 0.48 preferred, and less than or equal to about 0.40 more preferred. Also preferred within this range is an IV of greater than or equal to about 0.29, with greater than or equal to about 0.33 dl/g more preferred. It is also possible to utilize a high intrinsic viscosity poly(arylene ether) and a low intrinsic viscosity poly(arylene ether) in combination. Determining an exact ratio, when two intrinsic viscosities are used, will depend somewhat on the exact intrinsic viscosities of the poly (arylene ether) used and the ultimate physical properties that are desired.

Suitable poly(arylene ether)s include, but are not limited to, poly(2,6-dimethyl-1,4-phenylene ether); poly(2,3,6-trimethyl-1,4-phenylene) ether; poly(2,6-diethyl-1,4-phenylene) ether; poly(2-methyl-6-propyl-1,4-phenylene) ether; poly(2,6-dipropyl-1,4-phenylene) ether; poly(2-ethyl-6-propyl-1,4-phenylene)ether; poly(2,6-dilauryl-1,4-phenylene) ether; poly(2,6-diphenyl-1,4-phenylene) ether; poly(2,6-dimethoxy-1,4 phenylene) ether; poly(2,6-diethoxy-1,4-phenylene) ether; poly(2-methoxy-6-ethoxy-1,4-phenylene) ether; poly(2-ethyl-6-stearyloxy-1,4-phenylene) ether; poly (2,6-dichloro-1,4-phenylene) ether; poly(2-methyl-6-phenyl-1,4-phenylene) ether; poly(2-ethoxy-1,4-phenylene) ether; poly(2-chloro-1,4-phenylene) ether; poly(2,6-dibromo-1,4-phenylene) ether; poly(3-bromo-2,6-dimethyl-1,4-phenylene) ether; or a mixture of the foregoing poly (arylene ether)s.

Suitable base titratable functionalized poly(arylene ether) resins include, but are not limited to, those prepared via reaction with an appropriate acid or anhydride functionalization agent. For example those prepared by melt reaction of poly(arylene ether) with alpha, beta unsaturated carbonyl compounds, including maleic anhydride, maleic acid, fumaric acid, citraconic anhydride, citraconic acid, itaconic anhydride, itaconic acid, aconitic anhydride, aconitic acid, and their esters and amines; alpha-hydroxy carbonyl compounds including carboxylic acids such as citric acid and maleic acid; derivatives of 5-hydroxybenzene-1,2,4-tricarboxylic anhydride, such as the 5-acetyl-derivative or a 4-ester-derivative such as the phenyl ester; trimellitic anhydride aryl esters, including trimellitic anhydride phenyl salicylate; and reaction products and combinations comprising at least one of the foregoing, among others, can be employed. Alternatively, poly(arylene ether) may be functionalized with acidic or latent acidic groups in a suitable solvent. Examples of such processes include metallation of poly(arylene ether) in tetrahydrofuran (THF) followed by quenching with carbon dioxide or capping of poly(arylene ether) in toluene solution with trimellitic anhydride acid chloride. Typically, less than or equal to about 10 wt % functionalization agent can be used (based on the weight of the poly phenylene ether and the agent), with less than or equal to about 6 wt % preferred, and about 1.5 wt % to about 4 wt % especially preferred.

In one embodiment, the poly(arylene ether) comprises a capped poly(arylene ether). The capping may be used to prevent the oxidation of terminal hydroxy groups on the poly(arylene ether) chain. The terminal hydroxy groups may be inactivated by capping with an inactivating capping agent via an acylation reaction, for example. The capping agent chosen is desirably one that results in a less reactive poly (arylene ether) thereby reducing or preventing crosslinking of the polymer chains and the formation of gels or black specks during processing at elevated temperatures. Suitable capping agents include, for example, esters of salicylic acid, anthranilic acid, or a substituted derivative thereof, and the like; esters of salicylic acid, and especially salicylic carbonate and linear polysalicylates, are preferred. As used herein, the term "ester of salicylic acid" includes compounds in which the carboxy group, the hydroxy group, or both have been esterified. Suitable salicylates include, for example, aryl salicylates such as phenyl salicylate, acetylsalicylic acid, salicylic carbonate, and polysalicylates, including both linear polysalicylates and cyclic compounds such as disalicylide and trisalicylide. The preferred capping agents are salicylic carbonate and the polysalicylates, especially linear polysalicylates. When capped, the poly(arylene ether) may be capped to any desirable extent up to 80 percent, more preferably up to about 90 percent, and even more preferably up to 100 percent of the hydroxy groups are capped. Suitable capped poly(arylene ether) and their preparation are described in U.S. Pat. No. 4,760,118 to White et al. and U.S. Pat. No. 6,306,978 to Braat et al.

Capping poly(arylene ether) with polysalicylate is also believed to reduce the amount of aminoalkyl terminated groups present in the poly(arylene ether) chain. The aminoalkyl groups are the result of oxidative coupling reactions that employ amines in the process to produce the poly (arylene ether). The aminoalkyl group, ortho to the terminal hydroxy group of the poly(arylene ether), is susceptible to decomposition at high temperatures. The decomposition is believed to result in the regeneration of primary or secondary amine and the production of a quinone methide end group, which may in turn generate a 2,6-dialkyl-1-hydroxyphenyl end group. Capping of poly(arylene ether) containing aminoalkyl groups with polysalicylate is believed to remove such amino groups to result in a capped terminal hydroxy group of the polymer chain and the formation of 2-hydroxy-N,N-alkylbenzamine (salicylamide). The removal of the amino group and the capping provides a poly(arylene ether) that is more stable to high temperatures, thereby resulting in fewer degradative products, such as gels or black specks, during processing of the poly(arylene ether).

Based upon the foregoing, it will be apparent to those skilled in the art that the contemplated poly(arylene ether) resin may include many of those poly(arylene ether) resins presently known, irrespective of variations in structural units or ancillary chemical features.

The poly(arylene ether) are typically prepared by the oxidative coupling of at least one monohydroxyaromatic compound in the presence of a catalyst system and solvent. There is no particular limitation on the monohydric phenol used in the poly (arylene ether) synthesis. Suitable monohydroxyaromatic compounds include those according to the following formula (II)

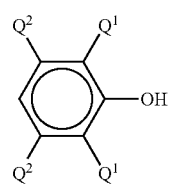

(II)

wherein each $Q^1$ is independently halogen, primary or secondary lower alkyl (e.g., alkyl containing up to 7 carbon atoms), phenyl, haloalkyl, aminoalkyl, hydrocarbonoxy, halohydrocarbonoxy wherein at least two carbon atoms separate the halogen and oxygen atoms, or the like; and each $Q^2$ is independently hydrogen, halogen, primary or secondary lower alkyl, phenyl, haloalkyl, hydrocarbonoxy, halohydrocarbonoxy wherein at least two carbon atoms separate the halogen and oxygen atoms, or the like. Preferably, each $Q^1$ is alkyl or phenyl, especially $C_{1-4}$ alkyl, and each $Q^2$ is hydrogen or $C_{1-4}$ alkyl. Preferred monohydroxyphenols include 2,6-dimethylphenol and 2,3,6-trimethylphenol.

In one embodiment, the monohydroxyphenol is 2,6-dimethylphenol having a purity of greater than about 99 weight percent, preferably greater than about 99.67 weight percent, and more preferably greater than about 99.83 weight percent. Additionally, the 2,6-dimethylphenol preferably comprises less than about 0.11 weight percent anisole and more preferably less than about 0.067 weight percent anisole. Anisole includes, for example, anisole, 2-methylanisole, 4-methylanisole, 2,4-dimethylanisole, 2,6-dimethylanisole, 2,4,6-trimethylanisole, or a combination comprising at least one of the foregoing anisoles. The 2,6-dimethylphenol also preferably comprises less than about 0.090 weight percent of other organic impurities and more preferably less than about 0.065 weight percent. Particular other organic impurities include, for example, 2,6-dimethylcyclohexanone, 7-methyl (2,3)dihydrobenzofuran, and (2,3)dihydrobenzofuran. Minimizing the quantity of anisole and other organic impurities is believed to reduce the odor of the resulting poly(phenylene ether).

The oxidative coupling of the monohydric phenol uses an oxygen-containing gas, which is typically oxygen ($O_2$) or air, with oxygen being preferred.

Suitable organic solvents for the oxidative coupling include aliphatic alcohols, ketones, aliphatic and aromatic hydrocarbons, chlorohydrocarbons, nitrohydrocarbons, ethers, esters, amides, mixed ether-esters, sulfoxides, and the like, and combinations comprising at least one of the foregoing organic solvents, providing they do not interfere with or enter into the oxidation reaction. Preferred solvents include $C_6$-$C_{18}$ aromatic hydrocarbons such as benzene, toluene, and xylene; halogenated hydrocarbons such as dichloromethane, and chloroform; and halogenated aromatic hydrocarbons such as chlorobenzene and dichlorobenzene.

The solvent may comprise, in addition to a $C_6$-18 aromatic hydrocarbon, a $C_3$-$C_8$ aliphatic alcohol that is a poor solvent for the poly(arylene ether), such as, for example, n-propanol, isopropanol, n-butanol, t-butanol, n-pentanol, and the like, and combinations comprising at least one of the foregoing $C_3$-$C_8$ aliphatic alcohols. The solvent may further comprise, in addition to a $C_6$-$C_{18}$ aromatic hydrocarbon and a $C_3$-$C_8$ aliphatic alcohol, methanol or ethanol, which act as an anti-solvent for the poly(arylene ether). The $C_6$-$C_{18}$ aromatic hydrocarbon, the $C_3$-$C_8$ aliphatic alcohol, and the methanol or ethanol may be combined in any proportion, but it may be preferred that the solvent comprise at least about 50 weight percent of the $C_6$-$C_{18}$ aromatic hydrocarbon.

Catalyst systems typically contain at least one heavy metal compound such as a copper, manganese or cobalt compound, usually in combination with various other materials. Suitable catalyst systems include cuprous chloride, cupric chloride, cuprous bromide, cupric bromide, cuprous sulfate, cupric sulfate, cuprous tetraamine sulfate, cupric tetraamine sulfate, cuprous acetate, cupric acetate, cuprous propionate, cupric butyrate, cupric laurate, cuprous palmitate and cuprous benzoate; and similar manganese salts and cobalt salts. Instead of direct addition of the above-exemplified metal salt, it is also possible to add a metal or a metal oxide and an inorganic acid, organic acid or an aqueous solution of such an acid and form the corresponding metal salt or hydrate.

The catalyst systems may also be complexed with a mono- or dialkylamine, aromatic amines or N,N'-dialkylalkylenediamines. Non-limiting examples of suitable primary, secondary or tertiary amines include mono- and dimethylamine, mono- and diethylamine, mono- and dipropylamine, mono- and dibutylamine, mono- and dibenzylamine, mono- and dicyclohexylamine, mono- and diethanolamine, methylethylamine, methylpropylamine, methylcyclohexylamine, ethylisopropylamine, benzylmethylamine, octylchlorobenzylamine, methylphenethylamine, benzylethylamine, dimethylbutylamine, N,N'-dialkylethylenediamines such as N,N'-di-tert-butylethylenediamine, and N,N'-di-isopropylethylenediamine, N,N,N'- trialkylethylenediamines, N,N'-dialkylpropylenediamines and N,N,N'-trialkylpropylenediamines.

Known processes to prepare poly(phenylene ether)s include European patent documents EP 1167421A2; EP1167419A2; and EP1167420A1, all of which are incorporated herein by reference. Further methods for preparing poly(phenylene ether)s are described, for example, in U.S. Pat. Nos. 6,407,200, 5,250,486; 5,017,655; 4,092,294; 4,083,828; 4,054,553; 3,962,181; 3,838,102; 3,733,299; 3,661,848; 3,642,699; 3,639,656; 3,365,422; 3,306,875; and 3,306,874, all of which are incorporated herein by reference. Based upon the foregoing, it will be apparent to those skilled in the art that the contemplated poly(arylene ether) may prepared by all methods presently known, irrespective of variations in processing conditions, reagents, or catalysts.

The term poly(alkenyl aromatic) resin as used herein includes polymers prepared by methods known in the art including bulk, suspension, and emulsion polymerization, which contain at least 25% by weight of structural units derived from an alkenyl aromatic monomer having the structure (III)

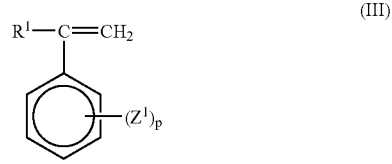

wherein $R^1$ is hydrogen, $C_1$-$C_8$ alkyl, or halogen; $Z^1$ is vinyl, halogen or $C_1$-$C_8$ alkyl; and p is 0 to 5. Preferred alkenyl aromatic monomers include styrene, chlorostyrene, and vinyltoluene. The poly(alkenyl aromatic) resins include homopolymers of an alkenyl aromatic monomer; random copolymers of an alkenyl aromatic monomer, such as styrene, with one or more different monomers such as acrylonitrile, butadiene, alpha-methylstyrene, ethylvinylbenzene, divinylbenzene and maleic anhydride; and rubber-modified poly(alkenyl aromatic) resins comprising blends and/or grafts of a rubber modifier and a homopolymer of an alkenyl aromatic monomer (as described above), wherein the rubber modifier may be a polymerization product of at least one $C_4$-$C_{10}$ nonaromatic diene monomer, such as butadiene or isoprene, and wherein the rubber-modified poly(alkenyl aromatic) resin comprises about 98 to about 70 weight percent of the homopolymer of an alkenyl aromatic monomer and about 2 to about 30 weight percent of the rubber modifier, preferably about 88 to about 94 weight percent of the homopolymer of an alkenyl aromatic monomer and about 6 to about 12 weight percent of the rubber modifier. These rubber modified polystyrenes include high impact polystyrene (commonly referred to as HIPS).

The poly(alkenyl aromatic) resins also include non-elastomeric block copolymers, for example diblock, triblock, and multiblock copolymers of styrene and a polyolefin. Non-elastomeric block copolymer compositions of styrene and butadiene can also be used that have linear block, radial block or tapered block copolymer architectures wherein the butadiene component is present up to about 35 weight percent. They are commercially available from such companies as Atofina as under the trademark FINACLEAR and Chevron Phillips Chemical Company under the trademark K-RESINS.

The poly(alkenyl aromatic) resins may also include block copolymers of styrene-polyolefin-methyl methacrylate, especially poly(styrene-b-1,4butadiene-b-methyl methacrylate (SBM) available from Atofina comprising blocks of polystyrene, 1,4-polybutadiene, and syndiotactic polymethyl methacrylate. SBM block copolymers available from Atofina include AF-X223, AF-X333, AF-X012, AF-X342, AF-X004, and AF-X250.

A preferred poly(alkenyl aromatic) is a homopolymer of the alkenyl aromatic monomer (III) wherein $R^1$ is hydrogen, lower alkyl or halogen; $Z^1$ is vinyl, halogen or lower alkyl; and p is from 0 to 5. A particularly preferred homopolymer of an alkenyl aromatic monomer is the homopolymer derived from styrene (i.e., homopolystyrene). The homopolystyrene preferably comprises at least 99% of its weight, more preferably 100% of its weight, from styrene.

The stereoregularity of the poly(alkenyl aromatic) resin may be atactic or syndiotactic. Highly preferred poly(alkenyl aromatic) resins include atactic and syndiotactic homopolystyrenes. Suitable atactic homopolystyrenes are commercially available as, for example, EB3300 from Chevron, and P1800 from BASF. Atactic homopolystyrenes are sometimes referred to herein as "crystal polystyrene" resins. Useful syndiotactic polystyrene resins (SPS) are available from The Dow Chemical Company under the QUESTRA trademark.

The poly(alkenyl aromatic) may have a number average molecular weight of about 20,000-100,000 atomic mass units (amu) and a weight average molecular weight of about 10,000-300,000 amu.

Solutions of poly(arylene ether) and poly(alkenyl aromatic) to be filtered, and the corresponding isolated polymeric material, may comprise poly(arylene ether) in an amount of about 90 to about 10 weight percent and poly (alkenyl aromatic) in an amount of about 10 to about 90 weight percent, based on the total weight of the poly(alkenyl aromatic) and poly(arylene ether). Within this range the amount of poly(arylene ether) may be less than or equal to about 80 weight percent, less than or equal to about 70 weight percent preferred, and less than or equal to about 60 weight percent more preferred. Also preferred within this range the amount of poly(arylene ether) may be greater than or equal to about 20 weight percent, greater than or equal to about 30 weight percent preferred, and greater than or equal to about 40 weight percent more preferred. Within this range the amount of poly(alkenyl aromatic) may be less than or equal to about 80 weight percent, less than or equal to about 70 weight percent preferred, and less than or equal to about 60 weight percent more preferred. Also preferred within this range is an amount of poly(alkenyl aromatic) of greater than or equal to about 20 weight percent, greater than or equal to about 30 weight percent preferred, and greater than or equal to about 40 weight percent more preferred.

The poly(arylene ether) used to make the solution may be from any available source or form such as pellet, powder, flake, and the like; or in solution as a direct product feed stream from a reactor or reaction vessel.

Suitable solvents for use in the solutions to be filtered include a halogenated aromatic solvent, a halogenated aliphatic solvent, a non-halogenated aromatic solvent, a non-halogenated aliphatic solvent, or a mixture thereof. Suitable halogenated aromatic solvents include, but are not limited to, halobenzenes, ortho-dichlorobenzene, chlorobenzene, and the like. Suitable halogenated aliphatic solvents include, but are not limited to, chloroform, methylene chloride, 1,2-dichloroethane, and the like. Suitable non-halogenated aromatic solvents include, but are not limited to, benzene, toluene, xylenes, anisole, nitrobenzene, and the like. Suitable non-halogenated aliphatic solvents include, but are not limited to ethyl acetate, acetone, and the like. The solvent may be the same type as the polymerization solvent employed in the process of producing the poly(arylene ether) resin and/or the poly(alkenyl aromatic).

There is no particular limitation on the method by which the polymeric material may be isolated from the filtrate. Suitable processes known in the art to remove a solvent from a resin may be employed. Such processes include, but are not limited to, precipitation, distillation, spray drying, devolatilization, evaporation through the use of flash vessels, a combination of the foregoing, and the like. The polymeric material may be isolated in the form of a powder, flake, or pellet.

Precipitation of the polymeric material from the filtrate may be performed by the addition of an anti-solvent solvent to the filtrate. The filtrate may optionally be concentrated prior to the addition of the anti-solvent. The method may, optionally, further comprise isolation of the precipitated polymeric material using any conventional collection filtration technique (as opposed to the filtration of particulate impurities) or solid/liquid separation technique. Suitable collection filtration apparatuses include rotating filters, continuous rotary vacuum filters, continuous moving bed filters, batch filters, and the like. Suitable solid/liquid separation apparatuses include continuous solid/liquid centrifuges.

The isolation by precipitation may, optionally, further comprise washing of the isolated, filtered polymeric material. Washing may be performed, for example, with additional anti-solvent directly on the collection filter or by mixing the "powder wetcake" from the collection filter or solid/liquid separation apparatus with additional anti-solvent in a stirred tank. A preferred method of washing the isolated, filtered polymeric material uses a two-stage reslurry and solid/liquid separation process scheme. In this embodiment, the wetcake from the collection filter may be washed with anti-solvent in a stirred tank; the polymeric material/solvent/anti-solvent mixture may then be separated in a solid/liquid continuous centrifuge and the polymeric material wetcake from the centrifuge may be mixed a second time with anti-solvent in a continuous stirred tank, followed by a second solid/liquid separation in a second solid/liquid centrifuge.

In one embodiment, poly(phenylene ether) isolated by precipitation preferably has a maximum powder IV deviation from target of less than about 3.0 milliliters per gram and more preferably less than about 1.5 milliliters per gram. Additionally, the precipitated poly(phenylene ether) has a powder IV increase on heat treatment of less than about 13.8 milliliters per gram and preferably less than about 12.5 milliliters per gram. Heat treatment, as used here, means film pressing the poly(phenylene ether) at 285° C. for four minutes.

The polymeric material may be isolated from the filtrate by a devolatilization process. Devolatilizing extruders and processes are known in the art and typically involve a twin-screw extruder equipped with multiple venting sections for solvent removal. The devolatilizing extruders most often contain screws with numerous types of elements adapted for such operations as simple feeding, devolatilization and liquid seal formation. These elements include forward-flighted screw elements designed for simple transport, and reverse-flighted screw and cylindrical elements to provide intensive mixing and/or create a seal. Particularly useful are counterrotating, non-intermeshing twin screw extruders, in which one screw is usually longer than the other to facilitate efficient flow through the die of the material being extruded. Such equipment is available from various manufacturers including Welding Engineers, Inc.

In one embodiment, isolation comprises pre-concentration (partial evaporation of the solvent) and devolatilization extrusion steps. During pre-concentration, the major part of the solvent is removed by evaporation, preferably at an elevated temperature, for example in the range from about 150 to about 300° C., more preferably in the range of about 180 to about 260° C., and/or elevated pressure, for example in the range from about 2 to about 75 bar, more preferably in the range of about 5 to about 50 bar. Pre-concentration removes about 1.0 to 99 percent of the solvent present in the filtrate. Within this range less than or equal to about 90 percent, preferably less than or equal to about 80 percent, and more preferably less than or equal to about 70 percent of the solvent is removed. Pre-concentration is followed by devolatilization extrusion to remove the residual solvent.

As an alternative to completely isolating the polymeric material using a devolatilization process, one or more resins may be added to the devolatilized polymeric material in the same process. The one or more resins may be fed into the devolatilizing extruder although additional extruders may also be used. Possible variations include melt feeding the one or more resins into the devolatilizing extruder or melt feeding the polymeric material from the devolatilizing extruder into a second compounding extruder as well as combinations of these. The one or more resins can vary widely and can also include additives, such as impact modifiers, lubricants, flame retardants, pigments, colorants, and the like.

The several processes described herein for isolation of the polymer may also be used to concentrate the filtrate without isolation of the polymer. The concentration of the filtrate provides a solution comprising an increased percent weight solids level of polymeric material as compared to the weight percent solids level of the polymeric material in the filtrate. Concentration to any percent weight solids level of polymeric material of about 1.0 to about 99 percent weight solids may be obtained. Within this range a concentration of the weight percent solids level of polymeric material of less than or equal to about 90 may be used, with less than or equal to about 80 preferred, and less than or equal to about 70 weight percent solids based on the total weight of polymeric material and solvent more preferred. Also within this range a concentration of the weight percent solids level of polymeric material of greater than or equal to about 10 may be used, with greater than or equal to about 30 preferred, and greater than or equal to about 50 weight percent solids based on the total weight of polymeric material and solvent more preferred.

When preparing blends of poly(arylene ether) solvent, monomers, and other low molecular weight materials may be removed from the extruder through the vent system. A particularly useful process to improve the removal of volatile substances from poly(arylene ether) or poly(arylene ether) resin blends includes steam stripping as describe in U.S. Pat. No. 5,204,410 to Banevicius et al., U.S. Pat. No. 5,102,591 to Hasson et al., U.S. Pat. No. 4,994,217 to Banevicius, and 4,992, 222 to Banevicius et al. Steam stripping is typically performed in an extruder comprising ports for the injection of water or steam and sufficient vacuum vent capability to remove the stripped volatiles and water. Water or steam are the preferred stripping agents, and the proportion employed is up to about 15 percent by weight of the polymer composition, to be divided equally, or unequally, among the two or more injection ports located along the length of the extruder barrel. The preferred proportion is from about 0.25 to about 15 weight percent, since an amount within this range is generally very effective for removal of volatiles without burdening the vacuum system. Most preferred is from 0.5 to about 5 weight percent.

The polymeric material isolated from the filtrate is preferably isolated in the form of pellets. The polymeric material may be pelletized by methods known in the art. For example, strands of polymeric material extruded from an extruder or similar device, may be cooled in clean water baths or cooled by water spray and then chopped into pellets. The water, prior to its use in the bath or spray, may be filtered to remove impurities. The pellets formed may be dried using techniques standard in the art including centrifugal dryers, batch or continuous oven dryers, fluid beds, and the like. Optionally, the polymeric material may be isolated as pellets in a "clean room" to prevent contamination of the polymeric material from the surroundings. A preferred pelletization method employs an underwater die-face pelletizer system. A suitable method of pelletizing is described in U.S. Pat. No. 6,372,175. Useful pelletizing machines, including die-face pelletizers, are described in U.S. Pat. Nos. 3,973,890, 4,421,470, and 5,607,700.

Rather than extruding pellets of the polymeric material, the polymeric material may be extruded as fibers, tubes, films, or sheets by appropriate choice of the die assembly.

The isolated polymeric material may, optionally, further comprise an additive selected from flame retardants, mold release agents and other lubricants, antioxidants, thermal stabilizers, ultraviolet stabilizers, pigments, dyes, colorants, anti-static agents, conductive agents, fillers, and the like, and a combination comprising at least one of the foregoing additives. Selection of particular additives and their amounts may be performed by those skilled in the art. If the additives are present prior to filtration, the additive should be selected so as to not interfere with the particular filtration system chosen for the method.

In one embodiment, additives may be added to the polymeric material after the filtration step by methods known in the art, either prior to or post isolation of the polymeric material. Depending upon the desired use for the polymeric material, the presence of the additives must not adversely affect the surface quality of molded articles. Special processing conditions during molding may be required to ensure an adequately smooth surface when molding filled articles.

Examples of pigments and dyes known to the art include those described in the chapter "Colorants" in "Plastic Additives Handbook, 4$^{th}$ Edition" R. Gachter and H. Muller (eds.), P. P. Klemchuck (assoc. ed.) Hansen Publishers, New York 1993.

Suitable colorants include organic and inorganic pigments and dyes. Suitable inorganic colorants include carbon black, iron oxide, titanium dioxide, zinc oxide, zinc sulfide, and the like. Suitable organic colorants include those from the following chemical classes: anthanthrone, anthraquinone, benzimidazolone, diketopyrrolo-pyrrole, dioxazine, diazo, indanthrone, isoindoline, isoindolinone, naphthol, perinone, perylene, phthalocyanine, pyranthrone, quinacridone, quinophthalone, and the like.

The polymeric material may also comprise flame retardants including non-halogenated flame retardants such as phosphate flame retardants, and halogenated flame retardants. Examples of suitable flame retardants include those found in the "Plastic Additives Handbook" under the chapter "Flame Retardants".

In one embodiment, a method of preparing a polymeric material comprises filtering a first solution through a first filtration system to form a first filtrate, wherein the first solution comprises a solvent, about 60 to about 30 percent by weight of poly(phenylene ether) and about 40 to about 70 percent by weight of polystyrene based on the total weight of poly(phenylene ether) and polystyrene; concentrating the first filtrate to form a second solution having a percent weight solids level greater than that of the first filtrate; filtering the second solution through a second filtration system to create a second filtrate; and isolating from the second filtrate a polymeric material comprising poly(arylene ether) and poly(alkenyl aromatic), wherein the polymeric material is substantially free of visible particulate impurities.

In one embodiment, articles are made from the polymeric materials prepared by any one of the methods presented herein. Particularly preferred articles include data storage media, such as but not limited to, optical, magneto or magneto-optical data storage media. Such media include compact discs, re-writable compact discs, digital versatile disks, high density disks for data archival technology (DVR, such as BLU-RAY DISC), and the like.

The articles may be made by a variety of molding and processing techniques. Suitable techniques to form articles include injection molding, foaming processes, injection-compression, rotary molding, two shot molding, microcellular molding, film casting, extrusion, press molding, blow molding, direct molding (see generally WO 02/43943 to Adedeji et al.), and the like. A preferred technique is injection molding.

If the polymeric material is used to form data storage media substrate, for example, additional processing such as electroplating, coating techniques (spin coating, spray coating, vapor deposition, screen printing, painting, dipping, sputtering, vacuum deposition, electrodeposition, meniscus coating, and the like), lamination, data stamping, embossing, surface polishing, fixturing, and combinations comprising at least one of the foregoing processes, among others conventionally known in the art, may be employed to dispose desired layers on the polymeric material substrate. Essentially, the substrate may optionally be formed, in situ, with the desired surface features disposed thereon on one or both sides, a data storage layer such as a magneto-optic material also on one or both sides, and an optional protective, dielectric, and/or reflective layers. The substrate can have a substantially homogenous, tapered, concave, or convex geometry, with various types and geometries of reinforcement optionally employed to increase stiffness without adversely effecting surface integrity and smoothness.

An example of a polymeric material storage media comprises an injection molded polymeric material substrate that may optionally comprise a hollow (bubbles, cavity, and the like) or filler (metal, plastics, glass, ceramic, etc., in various forms such as fibers, spheres, etc.) core. Disposed on the substrated are various layers including: a data layer, dielectric layer(s), a reflective layer, and/or a protective layer. These. layers comprise conventional materials and are disposed in accordance with the type of media produced. For example, for a first surface media, the layers may be protective layer, dielectric layer, data storage layer, dielectric layer, and then the reflective layer disposed in contact with the substrate. A preferred data storage media that may be prepared from the polymeric material described herein is disclosed in application Ser. No. 10/648,609, entitled "SUBSTRATE AND STORAGE MEDIA FOR DATA PREPARED THEREFROM" filed Aug. 26, 2003 and copending with the present application.

The invention is further illustrated by the following non-limiting examples.

EXAMPLES

One example (Example 1) and one comparative example (Comparative Example 1) were prepared to demonstrate the effect of filtering solutions of polyphenylene ether-polystyrene resin blends on the amount of particulate impurities of the resulting isolated material.

Example 1

A 40/60 by weight blend of polyphenylene ether (PPE, 0.33 IV PPE powder available from GE Plastics) and polystyrene (xPS, L3050) was prepared according to the following procedure. To a pre-heated (about 125° C.) nitrogen blanketed, stirred amount of reagent-grade ortho-dichlorobenzene (ODCB) was added 72.6 kilograms (kg) of PPE powder and 108.9 kg of xPS, to form a solution containing 20 percent by weight solids. The solution was heated to about 170° C. and gravity filtered through a 5-micrometer size filter bag.

After the first filtration step was completed, a portion of the ODCB was removed by distillation to pre-concentrate the 20 percent by weight solids solution to a polymer-solvent mixture containing about 40 percent by weight solids. The polymer-solvent mixture was charged to a feed tank and maintained at a temperature of about 160° C. and a pressure of about 80 psig (5.6 kg/cm$^2$) under nitrogen. A gear pump was used to transfer the polymer-solvent mixture at a rate of about 72 pounds of solution per hour (32.7 kg/hr) to a shell-and-tube heat exchanger maintained at about 310° C. (590° F.). Nitrogen was used to provide enough pressure (about 80 psig, 5.6 kg/cm$^2$) to feed the pump head of the gear pump.

The polymer-solvent mixture emerged from the heat exchanger having a temperature of about 270-280° C. and was fed through a parallel combination of two sintered-metal filters (PALL, 13-micrometer size pleated filters, surface area of about 1.5 ft$^2$ per filter (0.14 m$^2$) to remove particulate impurities within the feed solution. The temperature of the filter housings was maintained at about 280° C.

The filtered polymer-solvent mixture was then fed through a pressure control flash valve plumbed into the downstream edge of barrel 2 of a 10 barrel, 25 mm diameter, twin-screw, co-rotating intermeshing extruder having a L/D ratio of about 40. The temperature of the solution at the pressure-control flash valve was about 280-285° C. The extruder was operated at a screw speed of about 575 rpm and at about 20 percent drive torque. The measured extruder barrel temperatures were 321, 299, 318, 291, 290, 290, 289, and 290° C. (die).

The extruder was equipped with a closed chamber upstream of barrel 1, the closed chamber having a nitrogen line adapted for the controlled introduction of nitrogen gas before and during the solvent removal process. The extruder was further equipped at barrel 2 with a side feeder positioned orthogonal to the barrel of the extruder. The side feeder was not heated, had a L/D of about 10, and comprised two screws consisting of forward conveying elements only. At the end most distant from the extruder barrel, the side feeder was equipped with a single atmospheric vent (vent 1). The conveying elements of the screws of the side feeder were configured to convey toward the extruder and away from the side feeder vent.

The extruder was further equipped with two additional atmospheric vents at barrel 1 (vent 2), and barrel 4 (vent 3), and three vacuum vents (vents operated at subatmospheric pressure) at barrel 5 (vent 4), barrel 7 (vent 5) and barrel 9 (vent 6). The three atmospheric vents, two on the extruder and one on the side feeder, were each connected to a solvent removal and recovery manifold comprising solvent vapor removal lines, a condenser and liquid solvent receiving vessel. The vacuum vents were similarly adapted for solvent recovery. Vents 3, 4, 5 and 6 were equipped with Type "C" inserts. Vents 1 and 2 were not equipped with a vent insert.

The extruder screw elements consisted of both conveying elements and kneading elements. All of the conveying elements in both the extruder and the side feeder were forward flighted conveying elements. Kneading elements used included neutral, forward flighted and rearward flighted kneading elements depending on function. In barrels 2 and 3 of the extruder, kneading blocks consisting of forward and neutral flighted kneading elements were employed. The extruder screws were equipped with melt seals consisting of kneading blocks made up of rearward flighted kneading elements. The melt seals were located at barrels 5, and 8. The vacuum vents were located downstream of the melt seals on barrel 5, barrel 7 and barrel 9, and were operated at vacuum levels of about 28 inches of mercury (Hg) (711.2 mm of Hg, a vacuum gauge indicating full vacuum, or zero absolute pressure, would read about 30 inches of mercury or 762 mm of Hg).

Shell-and-tube heat exchangers were used as condensers to recover the ODCB solvent removed in the process. A slight vacuum (about 1 inch Hg, 25.4 mm of Hg) was applied to the heat exchanger receiving solvent vapor from the atmospheric vents to evacuate the solvent vapors. The devolatilized PPE-xPS resin which emerged from the die face (melt temperature about 310° C.) of the extruder was stranded and pelletized.

Prior to the run, the extruder was thoroughly cleaned by submitting the screws, vent port adaptors, vent inserts, die head/plate to an 454° C. sand-bath, and the extruder barrels were brushed prior to reassembly. The vacuum vents ran clean throughout the run, as determined by visual inspection at least every 15 minutes during the 12-hour long run. Only one filter housing was used for the entire 12-hour experiment. The differential pressure across the filter was constant throughout the run. Table 1 provides the processing data for Example 1.

TABLE 1

| Example | Solution Mass Flow Rate (kg/hr) | Torque (%) | Melt Temp (° C.) | Screw speed (rpm) | Actual Barrel Temperatures (° C.) | Temp. of Solution at Feed Tank (° C.) | Temp. of Feed after Heat Exchanger (° C.) | Temp of Heating Oil for Heat Exchanger (° C.) | Temp. of Feed at Pressure valve (° C.) |
|---|---|---|---|---|---|---|---|---|---|
| 1 | 32.7 | 20 | 310 | 575 | 321/299/318/ 291/290/290/ 289/290 (die) | 160 | 270-280 | 310 | 280-285 |

TABLE 1-continued

| Example | Solution Mass Flow Rate (kg/hr) | Torque (%) | Melt Temp (° C.) | Screw speed (rpm) | Actual Barrel Temperatures (° C.) | Temp. of Solution at Feed Tank (° C.) | Temp. of Feed after Heat Exchanger (° C.) | Temp of Heating Oil for Heat Exchanger (° C.) | Temp. of Feed at Pressure valve (° C.) |
|---|---|---|---|---|---|---|---|---|---|
| CE-1 | 13.9-15.9 | 20 | 305 | 450 | 317/289/289/ 290/290/290/ 281/290 | 162 | | | |

Comparative Example 1 (CE-1) was prepared similarly to Example 1, with some modifications, most importantly the PPE-xPS solution was filtered only once by gravity filtration through a filter bag. Additionally, the solution was not super-heated prior to its incorporation to the extruder used for isolation. A solution of PPE-xPS was prepared by combining 12.1 kg of 0.33 IV PPE powder and 18.1 kg of L3050 grade xPS in enough ODCB to form a 10 percent by weight solids solution. The resulting solution was heated to about 170° C. and gravity filtered through a 5-micrometer sized filter bag. The filtrate was concentrated to about a 40 percent by weight solids solution by removal of ODCB by distillation.

The solution was not superheated in a shell-and-tube heater and was not filtered through a combination of two sintered-metal filters prior to isolation of the polymeric material from the solvent. Isolation of the polymeric material was performed in a 25 mm-diameter twin-screw, co-rotating intermeshing extruder having 10 barrels (L/D=40); a 2-hole die plate; and six vents, two of which were located upstream of the feed port and operated at atmospheric pressure, and the other four vents were located downstream of the feed port and operated at relatively high levels of vacuum (about 28 inches of mercury (711.2 mm of Hg)). The atmospheric vents 1 and 2 were located at extruder barrel 1 and on a side feeder connected to barrel 2 of the extruder, respectively. The feed solution was added directly to the extruder at an injection port located at the downstream edge of barrel number 2. A side feeder, operated as a vent, was connected to the extruder at barrel number 2. Finally, the extruder was not cleaned prior to the run, but was purged for some time with the same solution used as the feed. Processing conditions for Comparative Example 1 can be found in Table 1.

Isolated PPE-xPS of Example 1 and Comparative Example 1 were tested for amounts of particulate impurities present in the filtered material. A particulate count of visible particulates was determined according the following procedure. Six, two ounce sample bottles with polyseal caps were subjected to a stream of filtered air to remove any particles present. The bottles were then rinsed with a small amount of chloroform ($CHCl_3$). Fifty milliliters (mL) of the $CHCl_3$ was added to each sample bottle and cap. Using a lightbox, the number of visible specks or fibers was recorded for each $CHCl_3$ blank. A 10.00 gram amount of each sample was weighed out on a clean aluminum pan and added to the bottles containing $CHCl_3$. Two samples of each isolated polymeric material were prepared along with two blanks. The samples were allowed to dissolve and then viewed in the lightbox for the presence of visible specks. The results of the visible particle analysis for the blank, Example 1, and Comparative Example 1 are found in Table 2.

Particulate impurities ranging in size from 5 to 100 micrometers present in the filtered materials were detected using a Pacific Instruments ABS2 analyzer which employs a laser light scattering technique. A 16.0 gram sample from Example 1 was dissolved in 400 mL of $CHCl_3$ contained in a clean polyethylene bottle. This procedure was repeated with the Comparative Example material. A 20 mL quantity of each sample solution was allowed to flow through the ABS2 analyzer detector at a flow rate of 1 mL/minute (+/−5%). The amount particulates ranging in size of about 5 to about 100 micrometers present in the sample was measured in the detector during this process. Five samples are taken from each bottle and averaged to yield the final particle size number. The results of the ABS2 analyzer particulate analysis for Example 1 and Comparative Example 1 are found in Table 2.

TABLE 7

| Visible Particles Particle size (micrometers) | Example 1 | | Comparative Example 1 | | Blank |
|---|---|---|---|---|---|
| | 3 Raw Data Particles/ml | 3 Blank Corrected Particles/gram | 3 Raw Data Particles/ml | 4 Blank Corrected Particles/gram | 1 Raw Data Particles/ml |
| 5 | 21.872 | 456.4 | 64.32 | 1517.60 | 3.616 |
| 10 | 4.12 | 82.4 | 10.736 | 247.80 | 0.824 |
| 15 | 1.912 | 39.6 | 2.264 | 48.40 | 0.328 |
| 20 | 1.704 | 20.4 | 1.848 | 24.00 | 0.888 |
| 30 | 0.44 | 2.2 | 0.848 | 12.40 | 0.352 |
| 40 | 0.04 | −3.2 | 0.072 | −2.40 | 0.168 |
| 50 | 0.408 | 4.2 | 0.707 | 11.68 | 0.24 |
| 100 | 0.336 | 6.6 | 0.224 | 3.80 | 0.072 |

The results of the above experiments show that the method used in Example 1 resulted in PPE-xPS material having significantly reduced amounts of particulate impurities when compared to Comparative Example 1. The additional filtration of the solution of Example 1 through a 13 micrometer sintered metal filter resulted in a material having greatly reduced amounts of particulate impurities having sizes of 15 micrometers or smaller.

Example 1 further illustrates the isolation/devolatilization of a relatively low weight percent solids solution comprising polyphenylene ether and polystyrene. The superheating of the polymer-solvent mixture allows for the efficient removal of solvent at twice the flow rate of Comparative Example 1 to provide an isolated polyphenylene ether-polystyrene composite.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

The invention claimed is:

1. A method of preparing a polymeric material, comprising:
    filtering a first solution comprising poly(arylene ether), poly(alkenyl aromatic), and a solvent through a first filtration system to form a first filtrate;
    concentrating the first filtrate to form a second solution having a percent weight solids level greater than that of the first filtrate;
    filtering the second solution through a second filtration system to create a second filtrate; and
    isolating from the second filtrate a polymeric material comprising poly(arylene ether) and poly(alkenyl aromatic).

2. The method of claim 1, wherein the polymeric material is substantially free of visible particulate impurities.

3. The method of claim 1, wherein the polymeric material is substantially free of particulate impurities having a diameter of about 15 micrometers or greater.

4. The method of claim 1, wherein the first filtration system and the second filtration system independently comprise a filter having a pore size of about 0.01 to about 50 micrometers.

5. The method of claim 1, wherein the first filtration system and the second filtration system independently comprise a sintered-metal filter, a cloth filter, a fiber filter, a paper filter, a pulp filter, a metal mesh filter, a ceramic filter, or a combination of the foregoing filters.

6. The method of claim 1, wherein the first filtration system and the second filtration system independently comprise a filter having a geometry that is cone, pleated, candle, stack, flat, wraparound, or a combination comprising at least one of the foregoing geometries.

7. The method of claim 1, wherein the first filtration system and the second filtration system independently comprise a filter having a pore size of about 0.01 to about 50 micrometers.

8. The method of claim 1, wherein the first filtration system and the second filtration system independently comprise a sintered metal filter having a pore size of about 1 to about 15 micrometers.

9. The method of claim 1, wherein the solvent is a halogenated aromatic solvent, a halogenated aliphatic solvent, a non-halogenated aromatic solvent, a non-halogenated aliphatic solvent, or a combination comprising at least one of the foregoing solvents.

10. The method of claim 1, wherein isolating the polymeric material comprises precipitating the polymeric material from the second filtrate or removing solvent from the second filtrate.

11. The method of claim 1, wherein isolating the polymeric material comprises removing solvent using a devolatilization extruder, a flash vessel, a distillation system, or a combination comprising at least one of the foregoing.

12. The method of claim 1, wherein the polymeric material is isolated in the form of a pellet, powder, or flake.

13. The method of claim 1, wherein the poly(arylene ether) comprises a plurality of structural units of the structure

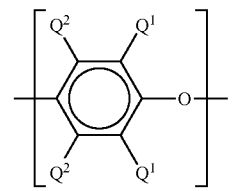

wherein for each structural unit, each $Q^1$ is independently primary or secondary $C_1$-$C_7$ alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy, or halohydrocarbonoxy wherein at least two carbon atoms separate the halogen and oxygen atoms.

14. The method of claim 1, wherein the poly(arylene ether) has an intrinsic viscosity of about 0.10 to about 0.60 deciliters per gram as measured in chloroform at 25° C.

15. The method of claim 1, wherein the poly(alkenyl aromatic) contains at least 25% by weight of structural units derived from an alkenyl aromatic monomer of the formula

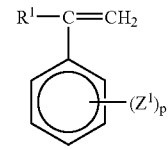

wherein $R^1$ is hydrogen, $C_1$-$C_8$ alkyl, or halogen; $Z^1$ is vinyl, halogen or $C_1$-$C_8$ alkyl; and p is 0 to 5.

16. The method of claim 1, wherein the poly(alkenyl aromatic) is atactic crystal polystyrene.

17. The method of claim 1, wherein the polymeric material comprises about 90 to about 10 percent by weight of the poly(arylene ether) and about 10 to about 90 percent by weight of the poly(alkenyl aromatic).

18. The method of claim 1, wherein the polymeric material comprises about 60 to about 30 percent by weight of the poly(arylene ether) and about 40 to about 70 percent by weight of the poly(alkenyl aromatic).

19. The method of claim 1, wherein the polymeric material further comprises flame retardants, mold release agents, lubricants, antioxidants, thermal stabilizers, ultraviolet stabilizers, pigments, dyes, colorants, anti-static agents, conductive agents, or a combination comprising at least one of the foregoing additives.

20. A method of preparing a polymeric material, comprising:
filtering a first solution through a first filtration system to form a first filtrate, wherein the first solution comprises a solvent, about 60 to about 30 percent by weight of poly(phenylene ether) and about 40 to about 70 percent by weight of polystyrene based on the total weight of poly(phenylene ether) and polystyrene;
concentrating the first filtrate to form a second solution having a percent weight solids level greater than that of the first filtrate;
filtering the second solution through a second filtration system to create a second filtrate; and
isolating from the second filtrate a polymeric material comprising poly(arylene ether) and poly(alkenyl aromatic), wherein the polymeric material is substantially free of visible particulate impurities.

21. A method of preparing a polymeric material, comprising:
filtering a first solution comprising poly(arylene ether) and a solvent through a first filtration system to form a first filtrate;
combining the first filtrate and a poly(alkenyl aromatic) to form a second solution;
filtering the second solution through a second filtration system to create a second filtrate; and
isolating from the second filtrate a polymeric material comprising poly(arylene ether) and poly(alkenyl aromatic).

22. The method of claim 21, wherein the polymeric material is substantially free of visible particulate impurities.

23. The method of claim 21, wherein the polymeric material is substantially free of particulate impurities having a diameter of about 15 micrometers or greater.

24. The method of claim 21, wherein the first filtration system and the second filtration system independently comprise a sintered-metal filter, a cloth filter, a fiber filter, a paper filter, a pulp filter, a metal mesh filter, a ceramic filter, or a combination comprising at least one of the foregoing filters.

25. The method of claim 21, wherein the first filtration system and the second filtration system independently comprise a filter having a geometry that is cone, pleated, candle, stack, flat, wraparound, or a combination comprising at least one of the foregoing geometries.

26. The method of claim 21, wherein the first filtration system and the second filtration system independently comprise a filter having a pore size of about 0.01 to about 50 micrometers.

27. The method of claim 21, wherein the solvent is a halogenated aromatic solvent, a halogenated aliphatic solvent, a non-halogenated aromatic solvent, a non-halogenated aliphatic solvent, or a combination thereof.

28. The method of claim 21, wherein the solvent is ortho-dichlorobenzene or toluene.

29. The method of claim 21, wherein the poly(alkenyl aromatic) is dissolved in a solvent prior to combining with the first filtrate.

30. The method of claim 21, further comprising concentrating the first filtrate to a percent solids level of greater than or equal to about 20 percent by weight solids based on the total of solvent and poly(arylene ether).

31. The method of claim 21, further comprising concentrating the second filtrate to a percent weight solids level of greater than about 40 percent by weight solids based on the total of solvent, poly(arylene ether), and poly(alkenyl aromatic).

32. The method of claim 21, wherein isolating the polymeric material comprises precipitating the polymeric material from the second filtrate or removing solvent from the second filtrate.

33. The method of claim 21, wherein isolating the polymeric material comprises removing solvent using a devolatilization extruder, a flash vessel, a distillation system, or a combination comprising at least one of the foregoing.

34. The method of claim 21, wherein the polymeric material is isolated in the form of a pellet, powder, or flake.

35. The method of claim 21, wherein the poly(arylene ether) comprises a plurality of structural units of the structure

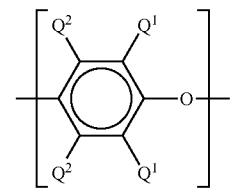

wherein for each structural unit, each $Q^1$ is independently halogen, primary or secondary $C_1$-$C_7$ alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy, or halohydrocarbonoxy wherein at least two carbon atoms separate the halogen and oxygen atoms.

36. The method of claim 21, wherein the poly(arylene ether) has an intrinsic viscosity of about 0.10 to about 0.60 deciliters per gram as measured in chloroform at 25° C.

37. The method of claim 21, wherein the poly(alkenyl aromatic) contains at least 25% by weight of structural units derived from an alkenyl aromatic monomer of the formula

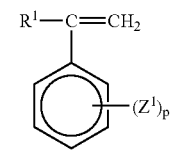

wherein $R^1$ is hydrogen, $C_1$-$C_8$ alkyl, or halogen; $Z^1$ is vinyl, halogen or $C_1$-$C_8$ alkyl; and p is 0 to 5.

38. The method of claim 21, wherein the poly(alkenyl aromatic) is atactic crystal polystyrene.

39. The method of claim 21, wherein the polymeric material comprises about 90 to about 10 percent by weight of the poly(arylene ether) and about 10 to about 90 percent by weight of the poly(alkenyl aromatic).

40. The method of claim 21, wherein the polymeric material comprises about 60 to about 30 percent by weight of the poly(arylene ether) and about 40 to about 70 percent by weight of the poly(alkenyl aromatic).

41. The method of claim 21, wherein the polymeric material further comprises flame retardants, mold release agents, lubricants, antioxidants, thermal stabilizers, ultraviolet stabilizers, pigments, dyes, colorants, anti-static agents, conductive agents, or a combination comprising at least one of the foregoing additives.

42. A method of preparing a polymeric material, comprising:
  filtering a superheated solution comprising poly(arylene ether), poly(alkenyl aromatic), and a solvent in a solution filtration system to form a filtrate; and
  isolating a polymeric material from the filtrate, wherein the polymeric material comprises poly(arylene ether) and poly(alkenyl aromatic).

43. The method of claim 42, wherein the polymeric material is substantially free of visible particulate impurities.

44. The method of claim 42, wherein the superheated solution is at a temperature greater than the boiling point of the solvent at atmospheric pressure.

45. The method of claim 42, wherein isolating the polymeric material comprises removing solvent using a devolatilization extruder, a flash vessel, a distillation system, or a combination comprising at least one of the foregoing.

46. An article comprising the polymeric material prepared by the method of claim 1, wherein the article is formed by injection molding, blow molding, extrusion, sheet extrusion, film extrusion, profile extrusion, pultrusion, compression molding, thermoforming, pressure forming, hydroforming, or vacuum forming; and
  wherein the article is substantially free of visible particulate impurities.

47. An article comprising the polymeric material prepared by the method of claim 21, wherein the article is formed by injection molding, blow molding, extrusion, sheet extrusion, film extrusion, profile extrusion, pultrusion, compression molding, thermoforming, pressure forming, hydroforming, or vacuum forming.
  wherein the article is substantially free of visible particulate impurities.

48. The method of claim 1, further comprising molding the polymeric material into a data storage medium substrate.

49. The article of claim 46, wherein the article is a data storage medium substrate and is substantially free of particulate impurities greater than about 15 micrometers.

50. The article of claim 47, wherein the article is a data storage medium substrate and is substantially free of particulate impurities greater than about 15 micrometers.

* * * * *